United States Patent [19]

Brack et al.

[11] 3,853,913

[45] Dec. 10, 1974

[54] BENZ-[C,D]-INDOLIUM DYESTUFFS

[75] Inventors: Alfred Brack; Hubertus Psaar, both of Leverkusen, Germany

[73] Assignee: Bayer Aktiengesellschaft, Leverkusen, Germany

[22] Filed: June 8, 1972

[21] Appl. No.: 260,914

[30] Foreign Application Priority Data
June 8, 1971  Germany.............................. 2128326

[52] U.S. Cl........ 260/326.9, 260/309.2, 260/310 C, 260/310 D, 260/313.1, 260/314.5, 260/335, 260/556 AR, 260/556 R, 8/3, 8/54.2, 8/62, 8/63, 8/177 R, 8/178 R, 8/179, 106/22, 260/144, 260/240 G, 260/240.9, 260/244, 260/251 Q, 260/256.5 R, 260/279 R, 260/283 SA, 260/294.8 E, 260/302 R, 260/304, 260/308 R

[51] Int. Cl............................................. C07d 27/44

[58] Field of Search............ 260/240 B, 313.1, 326.9

[56] References Cited
UNITED STATES PATENTS 2,337,909   12/1943   Martin et al. ................. 260/397.7 R
3,347,865   10/1967   Brack et al. ..................... 260/313.1

FOREIGN PATENTS OR APPLICATIONS 2,018,863   6/1960   France............................ 260/313.1

OTHER PUBLICATIONS

Northey et al., The Sulfonamides and Allied Compounds, Frontispage and page 104, Reinhold Pub. Corp. N.Y., (1948).

Northey et al., J. Am. Chem. Soc. vol. 64, pages 2763 to 2765, (1942).

*Primary Examiner*—John D. Randolph
*Attorney, Agent, or Firm*—Plumley & Tyner

[57] ABSTRACT

Cationic dyestuffs having one of the groups

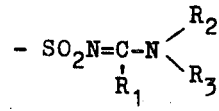

or

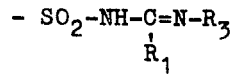

wherein $R_1$ and $R_2$ denote hydrogen, an alkyl, cycloalkyl, aralkyl, aryl or amino radical or a heterocyclic ring, $R_3$ denotes an alkyl, cycloalkyl or aralkyl radical, and $R_3$ can be bonded to $R_1$ or $R_2$, are adapted for the use in dyeing and printing natural and synthetic materials.

2 Claims, No Drawings

BENZ-[C,D]-INDOLIUM DYESTUFFS

The subject of the invention are new cationic dyestuffs of the general formula $$\left[ F(\text{———} B-Z)_n \right]^{m(+)} \quad mAn^{(-)} \qquad I$$

wherein
- F denotes the radical of a cationic dyestuff,
- B denotes a direct bond or a linking member,
- n denotes the numbers 1, 2, 3 or 4,
- m denotes the numbers 1 or 2,
- Z denotes the groupings $$-SO_2N=C-N\begin{matrix}R_2\\ \\R_3\end{matrix}$$
$$\phantom{-SO_2N=}R_1$$

or $$-SO_2-NH-C=N-R_3$$
$$\phantom{-SO_2-NH-}R_1$$

- $R_1$ denotes hydrogen, an alkyl, cycloalkyl, aralkyl or aryl radical, a disubstituted amino group or a heterocyclic ring,
- $R_2$ denotes hydrogen, an alkyl, cycloalkyl, aralkyl or aryl radical or an optionally substituted amino group or a heterocyclic ring,
- $R_3$ denotes an alkyl, cycloalkyl or aralkyl radical,
- $R_3$ can be bonded to $R_1$ or to $R_2$ by a direct bond or by a hetero-atom and
- $An^{(-)}$ denotes an anion, and
- the radical Z can be linked directly or via the bridge member B to a C-atom or an aromatic-carbocyclic or aromatic-heterocyclic ring of the cationic dyestuff.

The cationic dyestuffs can belong, for example, to the azo, anthraquinone, phthalocyanine, phthaloperinone, quinophthalone, formazane, azine, acridine, diarylmethane, and triarylmethane, xanthene, methine (including the various azamethine types), azomethine, hydrazone and nitro dyestuff series. Cyclammonium salts are preferred, and here again those of the methine series in the widest sense are preferred, that is to say cyclammonium salts of which the colour is attributable to the delocalisation of the charge in the chromophoric system.

Preferred dyestuffs are those of the general formula $$\left[ F'(\text{———} B-Z)_{n'} \right]^{m(+)} \quad mAn^{(-)} \qquad II$$

wherein
- F' denotes the cation of a dyestuff derived from thiazole, benzothiazole, pyrazole, indazole, pyrrole, indole, benz-(c,d)-indole, 1,3,3-trialkyl-2-methylene-indoline, pyrimidine, quinazoline, perimidine, quinoxaline, 1,2,4-triazole, pyridine, quinoline, isoquinoline, acridine, phenanthridine, azaphenalene or benzimidazole,
- n' denotes the number 1 or 2 and
- B, Z $An^{(-)}$ and m have the meaning explained above.

Dyestuffs to be singled out are those of the general formula $$\left[ R-N=C-K \atop \text{(naphthalene)} \right]^{(+)} \quad An^{(-)} \qquad III$$
$$\phantom{xxxxxxxxxx}-B-Z$$

wherein
- R denotes hydrogen or an alkyl, cycloalkyl, aralkyl or aryl radical,
- K denotes the groupings $$-A-N\begin{matrix}R_4\\R_5\end{matrix}\quad,\quad -A-O-R_6$$

$$-A'-N\begin{matrix}R_{11}\\ \phantom{x}\\ \phantom{x}\end{matrix}\begin{matrix}R_{10}\\C-C-R_9\\ | \phantom{xx} | \\ \phantom{x}\\ N=C-R_7\end{matrix}\begin{matrix}\phantom{x}\\R_8\end{matrix}\quad,$$

$$-C-C-R_9 \atop N\phantom{x}C-R_{10} \atop \phantom{x}N\phantom{x} \atop R_{12}\phantom{x}R_{11}$$
$$\begin{matrix}R_8\end{matrix}$$

and $R_{13}-C-N\begin{matrix}E\\ \\R_{14}\end{matrix}$

- A denotes an aromatic ring,
- A' denotes a direct bond or an aromatic ring,
- $R_4$ denotes hydrogen or an alkyl, cycloalkyl, aralkyl or aryl radical,
- $R_5$ denotes an alkyl, cycloalkyl, aralkyl or aryl radical,
- $R_6$ denotes an alkyl, cycloalkyl, aralkyl or aryl radical,
- $R_7$ denotes a styryl, aryl or heteryl radical,
- $R_8$ and $R_{10}$ denote hydrogen or an alkyl, aralkyl or cycloalkyl or aryl radical,
- $R_9$ and $R_{11}$ denote an alkyl or aryl radical,
- $R_{12}$ denotes an alkyl, cycloalkyl, aralkyl, aryl or heteryl radical, $R_{13}$ denotes hydrogen or an alkyl, cycloalkyl, aralkyl, aryl or heteryl radical or an alkoxy or alkoxycarbonyl group, $R_{14}$ denotes hydrogen or an alkyl, aralkyl or aryl radical and D denotes the remaining members of a 5-membered or 6-membered nitrogen-containing ring, $R_4$ and $R_5$ or A, $R_6$ and A, $R_8$ and $R_7$, $R_9$ or $R_{10}$ and $R_{11}$, and $R_{13}$ and $R_{14}$ can be bonded by a direct bond or by a hetero-atom and B, Z and $An^{(-)}$ have the abovementioned meaning and R can be bonded to the naphthalene ring and E represents the remaining members of a 5-membered or 6-membered ring.

Particularly preferred dyestuffs amongs these are those of the general formula

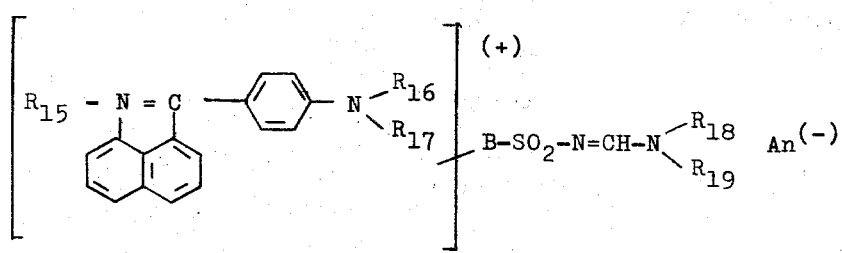

IV wherein $R_{15}$ denotes hydrogen or an alkyl or aralkyl radical, $R_{16}$ denotes hydrogen or an alkyl, cycloalkyl, aralkyl or aryl radical, $R_{17}$ denotes an alkyl, aralkyl or aryl radical, $R_{18}$ denotes an alkyl radical $R_{19}$ denotes an alkyl, aralkyl, aryl or heteryl radical, B and An have the meaning already indicated and $R_{15}$ and the naphthalene ring, $R_{16}$ and the phenylene ring or $R_{16}$ and $R_{17}$, and $R_{18}$ and $R_{19}$ can be linked by a direct bond or by a hetero-atom.

Suitable linking members B are, for example, saturated or unsaturated $C_1$–$C_{10}$-hydrocarbon radicals, preferably $C_1$–$C_4$-hydrocarbon radicals, such as methylene, ethylene 1,3-propylene, 1,4-butylene, hexamethylene or dekamethylene radicals, vinylene or allylene radicals, a hetero-atom such as nitrogen, oxygen, sulphur or phosphorus or a combination of one or more hetero-atoms with such hydrocarbon radicals. The linking member can also contain non-ionic substituents.

Possible anionic radicals $An^-$ are the organic and inorganic anions which are customary in cationic dyestuffs.

Inorganic anions are, for example, fluoride, chloride, bromide and iodide, perchlorate, hydroxyl, radicals of acids containing S, such as hydrogen sulphate, sulphate, disulphate and aminosulphate; radicals of nitrogen-oxygen acids, such as nitrate; radicals of oxygen-acids of phosphorus, such as dihydrogen phosphate, hydrogen phosphate, phosphate and metaphosphate; radicals of carbonic acid, such as bicarbonate and carbonate; further anions of oxygen-acids and complex acids, such as methosulphate, ethosulphate, hexafluosilicate, cyanate, thiocyanate, ferrocyanide, ferricyanide, trichlorozincate and tetrachlorozincate, tribromozincate and tetrabromozincate, stannate, borate, divanadate, tetravanadate, molybdate, tungstate, chromate, bichromate and tetrafluoborate, as well as anions of esters of boric acid, such as of the glycerine ester of boric acid, and of esters of phosphoric acid, such as of methyl phosphate.

Organic anions are, for example, anions of saturated or unsaturated aliphatic, cycloaliphatic, aromatic and heterocyclic carboxylic acids and sulphonic acids, such as radicals of acetic acid, chloroacetic acid, cyanoacetic acid, hydroxyacetic acid, aminoacetic acid, methylaminoacetic acid, aminoethyl-sulphonic acid, methylaminoethyl-sulphonic acid, propionic acid, n-butyric acid, i-butyric acid, 2-methyl-butyric acid, 2-ethyl-butyric acid, dichloroacetic acid, trichloroacetic acid, trifluoroacetic acid, 2-chloropropionic acid, 3-chloropropionic acid, 2-chlorobutyric acid, 2-hydroxypropionic acid, 3-hydroxypropionic acid, 0-ethylglycollic acid, thioglycollic acid, glyceric acid, malic acid, dodecyltetraethyleneglycol-ether-propionic acid, 3-(nonyloxy)-propionic acid, 3-(isotridecyloxy)-propionic acid, 3-(isotridecyloxy)-diethyleneglycol-ether-propionic acid, the ether-propionic acid of the alcohol mixture with 6 to 10 carbon atoms, thioacetic acid, 6-benzoylamino-2-chlorocaproic acid, nonylphenoltetraethyleneglycol-ether-propionic acid, nonylphenoldiethyleneglycol-ether-propionic acid, dodecyltetraethyleneglycol-ether-propionic acid, phenoxyacetic acid, nonylphenoxyacetic acid, n-valeric acid, i-valeric acid, 2,2,2-trimethylacetic acid, n-caproic acid, 2-ethyl-n-caproic acid, stearic acid, oleic acid, ricinoleic acid, palmitic acid, n-pelargonic acid, lauric acid, a mixture of aliphatic carboxylic acids with 9 to 11 carbon atoms (Versatic Acid 911 of SHELL), a mixture of aliphatic carboxylic acids with 15 to 19 carbon atoms (Versatic Acid 1519 of SHELL), coconut fatty acid first runnings, undecanecarboxlyic acid, n-tridecanecarboxylic acid and a coconut fatty acid mixture; acrylic acid, methacrylic acid, crotonic acid, propargylic acid, oxalic acid, malonic acid, succinic acid, glutaric acid, adipic acid, pimelic acid, suberic acid, azeleic acid, the isomer mixture of 2,2,4- and 2,4,4-trimethyladipic acid, sebacic acid, isosebacic acid (isomer mixture), tartaric acid, citric acid, glyoxylic acid, dimethyl-ether-$\alpha,\alpha'$-dicarboxylic acid, methylene-bis-thioglycollic acid, dimethylsulphide-$\alpha,\alpha$-dicarboxylic acid, 2,2'-dithio-di-n-propionic acid, fumaric acid, maleic acid, itaconic acid, ethylene-bis-iminoacetic acid, nitrilosulphonic acid, methanesulphonic acid, ethanesulphonic acid, chloromethanesulphonic acid, 2-chloroethanesulphonic acid and 2-hydroxyethanesulphonic acid, and mersolate, that is to say $C_8$–$C_{15}$-paraffinsulphonic acid, obtained by chlorosulphonation of paraffin oil.

Suitable anions of cylcoaliphatic carboxylic acids are, for example, the anions of cyclohexanecarboxylic acid and cyclohexene-3-carboxylic acid and anions of araliphatic monocarboxylic acids are, for example, anions of phenylacetic acid, 4-methylphenylacetic acid and mandelic acid.

Suitable anions of aromatic carboxylic acids are, for example, the anions of benzoic acid, 2-methylbenzoic acid, 3-methylbenzoic acid, 4-methylbenzoic acid, 4-tert.-butylbenzoic acid, 2-bromobenzoic acid, 2-chlorobenzoic acid, 3-chlorobenzoic acid, 4-chlorobenzoic acid, 2,4-dichlorobenzoic acid, 2,5-dichlorobenzoic acid, 2-nitrobenzoic acid, 3-nitrobenzoic acid, 4-nitrobenzoic acid, 2-chloro-4-nitrobenzoic acid, 6-chloro-3-nitro-benzoic acid, 2,4-dinitrobenzoic acid, 3,4-dinitrobenzoic acid, 3,5-dinitrobenzoic acid, 2-hydroxybenzoic acid, 3-hydroxybenzoic acid, 4-hydroxybenzoic acid, 2-mercaptobenzoic acid, 4-nitro-3-methylbenzoic acid, 4-aminobenzoic acid, 5-nitro-2-hydroxybenzoic acid, 3-nitro-2-hydroxybenzoic acid, 4-methoxybenzoic acid, 3-nitro-4methoxybenzoic acid, 4-chloro-3-hydroxybenzoic acid, 3-chloro-4-hydroxybenzoic acid, 5-chloro-2-hydroxy-3-methylbenzoic acid, 4-ethylmercapto-2-chlorobenzoic acid, 2-hydroxy-3-methylbenzoic acid, 6-hydroxy-3-methylbenzoic acid, 2-hydroxy-4-methylbenzoic acid 6-hydroxy-2,4-dimethylbenzoic acid, 6-hydroxy-3-tert.-butylbenzoic acid, phthalic acid, tetrachlorophthalic acid, 4-hydroxyphthalic acid, 4-methoxyphthalic acid, isophthalic acid, 4-chloroisophthalic acid, 5-nitroisophthalic acid, terephthalic acid, nitroterephthalic acid and diphenyl-3,4-carboxylic acid, o-vanillic acid, 3-sulphobenzoic acid, benzene-1,2,4,5-tetracarboxylic acid, naphthalene-1,4,5,8-tetracarboxylic acid, biphenyl-4-carboxylic acid, abietic acid, phthalic acid mono-n-butyl ester, terephthalic acid monomethyl ester, 3-hydroxy-5,6,7,8-tetrahydronaphthalene-2-carboxylic acid, 2-hydroxy-1-naphthoic acid and antraquinone-2-carboxylic acid.

Suitable anions of heterocyclic carboxylic acids are, for example, the anions of pyromucic acid, dehydromucic acid and indolyl-3-acetic acid.

Suitable anions of aromatic sulphonic acids are, for example, the anions of benzenesulphonic acid, benzene-1,3-disulphonic acid, 4-chlorobenzenesulphonic acid, 3-nitrobenzenesulphonic acid, 6-chloro-3-nitrobenzenesulphonic acid, toluene-4-sulphonic acid, toluene-2-sulphonic acid, toluene-ω-sulphonic acid, 2-chlorotoluene-4-sulphonic acid, 1-hydroxybenzenesulphonic acid, n-dodecylbenzenesulphonic acid, 1,2,-3,4-tetrahydronaphthalene-6-sulphonic acid, naphthalene-1-sulphonic acid, naphthalene-1,4-disulphonic acid or naphthalene-1,5-disulphonic acid, naphthalene-1,3,5-trisulphonic acid, 1-naphthol-2-sulphonic acid, 5-nitronaphthalene-2-sulphonic acid, 8-aminonaphthalene-1-sulphonic acid, stilbene-2,2'-disulphonic acid and biphenyl-2-sulphonic acid.

a suitable anion of heterocyclic sulphonic acids is, for example, the anion of quinoline-5-sulphonic acid.

Further possibilities are the anions of arylsulphinic, arylphosphonic and arylphosphonous acids, such as benzenesulphinic and benzenephosphonic acid.

By an alkyl radical, there is understood a saturated or olefinically unsaturated aliphatic radical with 1 to 6 C atoms, which can contain non-ionic substituents and/or carboxyl groups, for example the methyl, ethyl, n- and iso-propyl, n- and iso- and tert. butyl and the various isomeric pentyl and hexyl radicals, as well as vinyl, allyl or propenyl radicals.

Cycloalkyl radicals denote, for example, cyclopentyl and cyclohexyl radicals which can be substituted by nonionic radicals and/or carboxyl groups.

Aryl radicals are, for example, phenyl radicals which may be substituted by non-ionic substituents and/or by carboxyl groups, and their ring-fusion products, such as the naphthalene radical which may be substituted by non-ionic substituents and/or by carboxyl groups.

Aralkyl radicals are, for example, alkyl radicals substituted by aryl or heteryl radicals.

Heteryl radicals are 5-membered or 6-membered unsaturated heterocyclic rings, such as the thienyl, pyridyl, pyrrolyl, indolyl-2, indolyl-3, benzthiazolyl-2 or benzoxazolyl-2 radical.

Non-ionic substituents in the sense of the present invention are the non-dissociating substituents which are customary in dyestuff chemistry, such as halogen, alkyl, cycloalkyl, hydroxyl, alkoxy, aralkoxy, cycloalkoxy, aryloxy, acyloxy, acylalkoxycarbonyl, amidocarbonyl, nitrile, nitro, amino, alkylamino, dialkylamino, acylamino, sulphonylamino, sulphonyl, amidosulphonyl, mercapto, alkylmercapto and arylmercapto groups.

The most valuable of the preferred dyestuffs of the formula IV are those of the formulae V to IX.

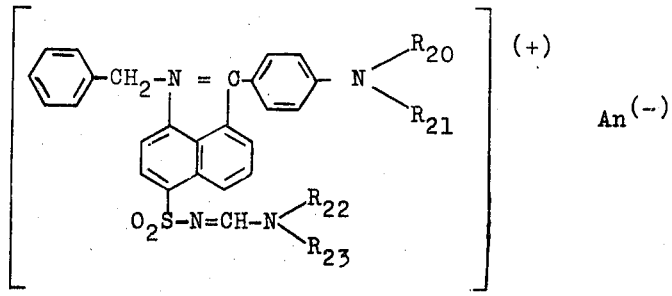

V

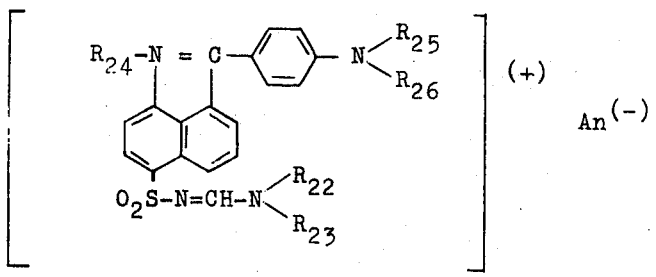

VI

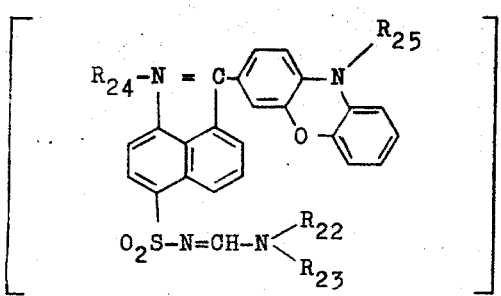

VII

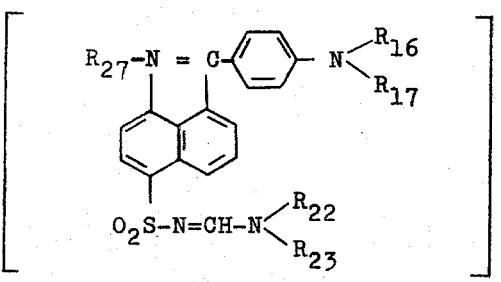

VIII

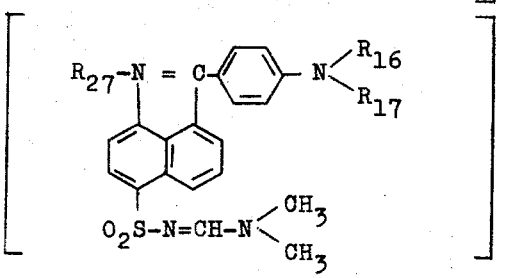

IX wherein $R_{16}$, $R_{17}$ and An have the meaning already indicated, $R_{20}$ denotes hydrogen or an alkyl radical with 1 to 4 C atoms, $R_{21}$ denotes an alkyl radical with 1 to 4 C atoms or a phenyl radical, $R_{22}$ denotes an alkyl radical with 1 to 4 C atoms or a phenyl radical, $R_{23}$ denotes an alkyl radical with 1 to 4 C atoms or together with $R_{22}$ and the N-atom represents a pyrrolidine, piperidine, piperazine or morpholine ring, $C_4$-alkoxy-ethyl group or an aralkyl radical and $R_{27}$ denotes a methyl or ethyl group, and the quoted number of C atoms of the lower alkyl radicals relates to the uninterrupted carbon chain of the alkyl radical, excluding possible carbon-containing substituents, and the lower alkyl radicals, the naphthalene ring, the p-phenylene ring which represents A, the phenyl radical which represents $R_{21}$ and the aralkyl radical which represents $R_{26}$ can be substituted by nonionic substituents and/or carboxyl groups.

Further particularly valuable dyestuffs are those of the formula

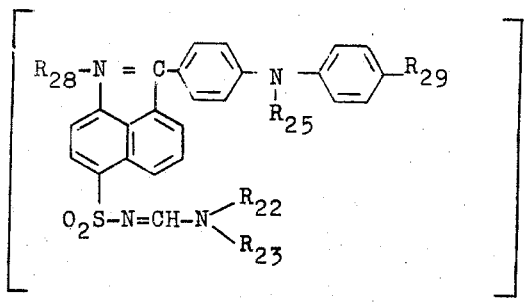

X $r_{24}$ denotes an alkyl radical with 1 to 5 C atoms, $R_{25}$ denotes a methyl, ethyl, n-propyl, n-butyl, β-alkoxycarbonyl-, β-cyano-, β-chloro- or β-$C_1$-$C_4$-alkoxyethyl group, $R_{26}$ denotes a methyl, ethyl, n-propyl, n-butyl, β-hydroxycarbonyl-, β-cyano-, β-chloro-, or β-$C_1$- wherein $R_{22}$, $R_{23}$, $R_{25}$ and An$^{(-)}$ have the meaning already indicated, $R_{28}$ represents a methyl, ethyl, n-propyl, n-butyl, n-amyl, iso-amyl, β-cyanoethyl, β-chloroethyl, β-hydroxyethyl, β-($C_1$-$C_4$-alkoxy)-ethyl, β-($C_1$-$C_4$- alkoxycarbonyl)-ethyl, β-amidocarbonylethyl or (C₁–C₄)-alkoxycarbonylmethyl group and R₂₉ represents hydrogen or a methyl, ethyl, methoxy, ethoxy, n- and iso-propoxy, n- and iso-butoxy, or benzyloxy group.

Amongst these dyestuffs those of the formula

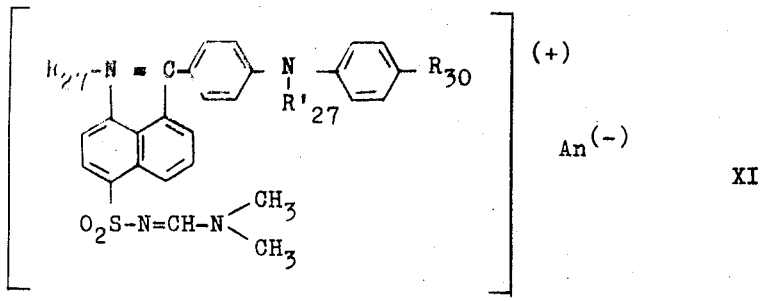

XI wherein

R₂₇ and An have the meaning already indicated,

R'₂₇ independently of R₂₇ also denotes a methyl or ethyl group and

R₃₀ denotes hydrogen or a methoxy or ethoxy group, are preferred.

Furthermore, dyestuffs of the formula

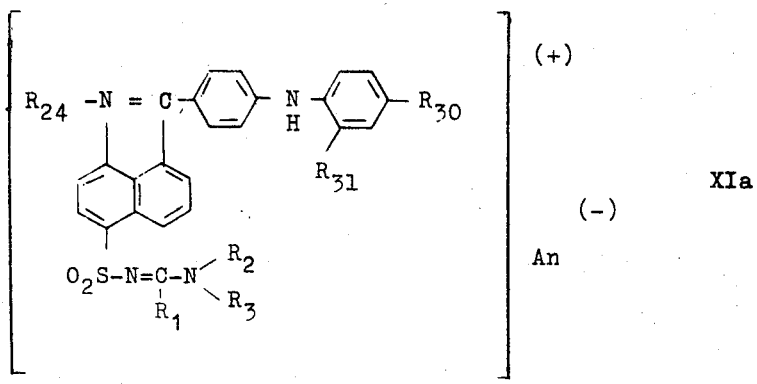

XIa wherein

R₁, R₂, R₃, R₂₄, R₃₀ and An⁽⁻⁾ have the meaning already indicated and

R₃₁ represents hydrogen, a lower alkyl or alkoxy group with 1 to 4 C atoms, an acylamino or a sulphonylamino group, are particularly valuable.

A further object of the present application are processes for dyeing, printing and bulk dyeing synthetic materials of polymerised unsaturated nitriles, such as polyacrylonitrile or vinylidene cyanide, acid-modified polyesters and acid-modified polyamides, as well as the products consisting of these materials and dyed, printed and/or bulk-dyed with the dyestuffs according to the invention.

A further object of the present application are processes for the manufacture of dyestuffs of the formulae I to XIa, which are characterised in that in cationic dyestuffs or dyestuff intermediate products at least one group Z, which has the meaning indicated in the formula (I), is introduced in accordance with processes which are in themselves known and that in the case of the introduction into intermediate products, these products are then converted, in a manner which is in itself known, into cationic dyestuffs.

Dyestuffs of the formula (III) are obtained, for example, by condensation of intermediate products of the formula

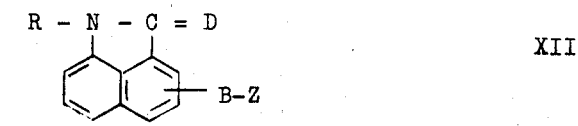

XII or

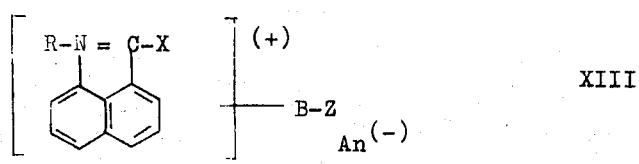

XIII especially those of the formula

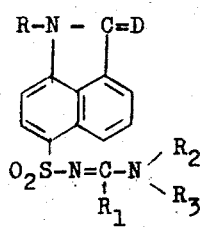 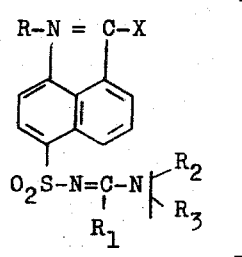

XIIa    or    XIIIa wherein
D represents oxygen, sulphur or a substituted amino group,
X represents a radical which can be split off as an anion, and
$An^{(-)}$ represents an anion and wherein
B, Z, R, $R_1$, $R_2$ and $R_3$ have the meaning already indicated,
with compounds K-H, for example the compounds XIV-XVIII:

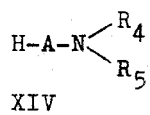    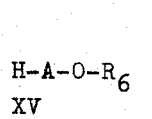    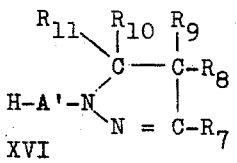

XIV    XV    XVI

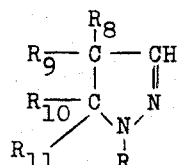    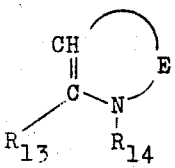

XVII    XVIII wherein
A, A', E and $R_4$ to $R_{14}$ have the meaning already indicated,
using a condensation agent which furnishes an anion $An^{(-)}$, such as phosphorus oxychloride, phosphorus trichloride, phosphorus pentachloride, thionyl chloride, tin tetrachloride, titanium tetrachloride and phsogene, optionally with the addition of other agents which have the effect of splitting off water, such as phosphorus pentoxide, aluminium chloride, zinc chloride or boron fluoride, it also being possible to dispense with the condensation agent when using a compound XIII or XIII a.

A further subject of the invention is the conversion of those cationic dyestuffs which are salts of proton acids and contain n-groups —B-Z, into the dyestuff bases from which they are derived, and their quaternisation by treatment with the reagents known for this purpose, such as dimethyl sulphate and diethyl sulphate, toluene-(or benzene-) sulphonic acid methyl ester, ethyl ester, n-propyl ester, β-chloroethyl ester, β-cyanoethyl ester, β-hydroxyethyl ester and β-ethoxyethyl ester, benzyl chloride, 4-methoxybenzyl chloride, allyl chloride and allyl bromide, β-dimethylaminoethyl chloride and β-chloro-(and bromo-)ethylpiperdine and -morpholine.

Processes which are particularly highlighted are those which are characterised in that compounds of the formula

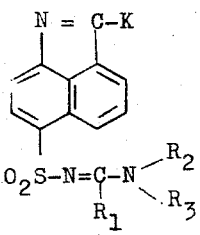

XIX wherein
K, $R_1$, $R_2$ and $R_3$ have the meaning already indicated, are treated with quaternising agents in the presence or absence of an inert solvent. As inert solvents it is possible to use, for example, halogenated hydrocarbons, such as chlorobenzene, dichlorobenzene, methylene chloride, chloroform, carbon tetrachloride, ethylene chloride, tetrachlorethane, hydrocarbons such as benzene, toluene, xylene or tetralin or polar solvents such as nitrobenzene, nitromethane, dioxane, dimethylformamide or N-methylpyrrolidone.

A further subject of the invention are dyestuff intermediate products of the formula

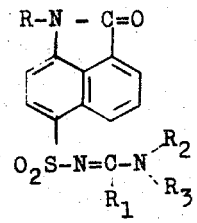

XX wherein
R denotes hydrogen, or an alkyl, cycloalkyl, aralkyl or aryl radical,
$R_1$ denotes hydrogen, an alkyl, cycloalkyl, aralkyl or aryl radical, a disubstituted amino group or a heterocyclic ring, R₂ denotes hydrogen, an alkyl, cycloalkyl, aralkyl or aryl radical or an optionally substituted amino group or a heterocyclic ring and R₃ denotes an alkyl, cycloalkyl or aralkyl radical, especially those of the formula

XXI

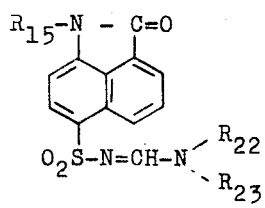

wherein $R_{15}$ denotes hydrogen or an alkyl or aralkyl radical, $R_{22}$ denotes an alkyl radical with 1 to 4 C atoms or a phenyl radical and $R_{23}$ denotes an alkyl radical with 1 to 4 C atoms or a phenyl radical or conjointly with $R_{22}$ denotes a pyrrolidine, piperidine, piperazine or morpholine ring.

The introduction of the grouping Z into a dyestuff or into a dyestuff intermediate product can be effected as follows:

1. A sulphochloride of a cationic dyestuff or dyestuff intermediate product or another derivative of an appropriate sulphonic acid which reacts analogously is condensed with an amidine or guanidine.

2. A primary sulphonamide of a cationic dyestuff or dyestuff intermediate product is condensed with an active derivative of an amide or urea. Such active derivatives are, for example, acetals such as dimethylformamide-dimethyl-acetal, thio-compounds such as dimethyl-thioformamide and isothiuronium salts—for example the adduct of dimethyl sulphate to tetrasubstituted thioureas—but above all the reaction products, known from the Vilsmeier reaction, with acid halides such as phosphorus oxychloride and phosgene, as well as adducts with alkylating agents such as dimethyl sulphate and toluenesulphonic acid esters.

3. According to W. Logemann and D. Artini, Chem. Ber. 90, 2725 (1957).

4. According to C. Runti, L. Sindellari and F. Ulian, Aun, Chimica 50, 847 (1960).

Suitable amides or ureas are, for example, dimethyl-, diethyl-, di-n-propyl-, di-iso-propyl-, di-n-butyl-, di-isoamyl-, phenyl-methyl-, phenyl-ethyl-, phenyl-n-butyl-, methylcyclohexyl-, ethyl-βphenylethyl-, di-β-phenylethyl-, methyl-β-chloroethyl-, methyl-β-cyanoethyl-, methyl-β-ethoxycarbonylethyl-, methyl-β-methoxyethyl-, di-β-chloroethyl- and di-β-methoxyethyl-formamide) N-formyl-, N-acetyl-, N-benzoyl-, N-phenacetyl- and N-dimethylamidocarbonyl-pyrrolidine, -piperdine, -morpholine and -piperazine, dimethyl- and diethyl-trimethylacetamide and -benzamide, tetramethyl- and tetraethyl-urea, N,N'carbonyl-bis-pyrrolidine, -piperidine and -morpholine, N-methyl- and N-ethyl-α-pyrrolidone and N-methyl-, N-ethyl- and N-benzyl-α-piperidone.

Suitable amidines and guanidines are the corresponding imino derivatives.

The introduction of the grouping Z into a dyestuff intermediate product can be combined with the subsequent conversion of this intermediate product into a cationic dyestuff, resulting in a "one-pot process." This combination results particularly smoothly if the grouping Z is introduced according to (2), using a Vilsmeier complex.

Compounds of the formulae XIIa, XIIIa and XIX suitable for the manufacture of the dyestuffs of the formulae I to XI are listed in Tables 1, 2 and 3 below.

Table 1

Compounds of the formula XII a

| R | D | $R_1$ | $R_2$ | $R_3$ |
|---|---|---|---|---|
| Methyl | Oxygen | Hydrogen | Methyl | Methyl |
| Ethyl | " | " | " | " |
| n-Propyl | " | " | " | " |
| iso-Propyl | " | " | " | " |
| n-Butyl | " | " | " | " |
| iso-Butyl | " | " | " | " |
| tert.-Butyl | " | " | " | " |
| n-Amyl | " | " | " | " |
| iso-Amyl | " | " | " | " |
| neo-Pentyl | " | " | " | " |
| Ethyl | " | " | " | Phenyl |
| " | " | " | " | 4-Methoxyphenyl |
| " | " | " | Ethyl | Ethyl |
| " | " | " | n-Butyl | n-Butyl |
| " | " | " | iso-Amyl | iso-Amyl |

TABLE 1—Continued

| R | D | R₁ | R₂ | R₃ |
|---|---|---|---|---|
| Ethyl | Oxygen | Methyl | Methyl | Methyl |
| " | " | Ethyl | " | " |
| " | " | Dimethylamino | " | " |
| " | " | N-Piperidyl | Pentamethylene | Pentamethylene |
| " | " | N-Morpholinyl | $-CH_2-CH_2-O-CH_2-CH_2-$ | $-CH_2-CH_2-O-CH_2-CH_2-$ |
| " | Sulphur | Hydrogen | Methyl | Methyl |
| " | Phenylimino | " | " | " |
| " | p-Tosylimino | " | " | " |
| Cyclohexyl | Oxygen | " | " | " |
| β-Phenylethyl | " | " | " | " |
| Benzyl | " | " | " | " |
| 4-Methylbenzene | " | " | " | " |
| 4-Methoxybenzene | " | " | " | " |
| 4-Chlorobenzyl | " | " | " | " |
| Phenyl | " | " | " | " |
| 4-Methyl-phenyl | " | " | " | " |
| 4-Methoxy-phenyl | " | " | " | " |
| β-Chloroethyl | Oxygen | Hydrogen | Methyl | Methyl |
| β-Cyanoethyl | " | " | " | " |
| β-Dimethylaminoethyl | " | " | " | " |
| β-Ethoxycarbonylethyl | " | " | " | " |
| Ethoxycarbonylmethyl | " | " | " | " |
| β-Methoxyethyl | " | " | " | " |
| Hydrogen | " | " | " | " |
| " | Sulphur | " | " | " |
| " | Phenylimino | " | " | " |
| β-Hydroxycarbonylethyl | Oxygen | " | " | " |
| Ethyl | " | " | " | Tetramethylene |
| " | " | " | " | Pentamethylene |
| " | " | " | " | $-CH_2-CH_2-O-CH_2-CH_2-$ |
| " | " | " | " | $-CH_2-CH_2-N-CH_2-CH_2-$ <br> $\quad\quad\quad\quad\;\;\mid$ <br> $\quad\quad\quad\;\;CH_2-CH_2-CN$ |

Table 2

Compounds of the formula XIII a

| R | X' | R₁ | R₂ | R₃ | An |
|---|---|---|---|---|---|
| Methyl | Methylmercapto | Hydrogen | Methyl | Methyl | Methosulphate |
| Ethyl | do. | do. | do. | do. | do. |
| n-Propyl | do. | do. | do. | do. | do. |
| n-Butyl | do. | do. | do. | do. | do. |
| iso-Amyl | do. | do. | do. | do. | do. |
| β-Cyanoethyl | do. | do. | do. | do. | do. |
| β-Ethoxyethyl | do. | do. | do. | do. | do. |
| Phenyl | do. | do. | do. | do. | do. |
| Ethyl | Chlorophosphoryloxy | do. | do. | do. | Chloride |
| do. | Chlorocarbonyloxy | do. | do. | do. | do. |
| do. | Chlorine | do. | do. | do. | do. |

Table 3

Compounds of the formula XIX

| K | $R_1$ | $R_2$ | $R_3$ |
|---|---|---|---|
| 4-Dimethylamino-phenyl | Hydrogen | Methyl | Methyl |
| 4-Diethylamino-phenyl | do. | do. | do. |
| 4-Di-n-propylamino-phenyl | do. | do. | do. |
| 4-N-Methyl-N-isobutylamino-phenyl | do. | do. | do. |
| 4-N-Ethyl-N-$\beta$-hydroxyethyl-amino-phenyl | do. | do. | do. |
| 4-N-Ethyl-N-$\beta$-chloroethyl-amino-phenyl | do. | do. | do. |
| 4-N-Ethyl-N-$\beta$-cyanoethyl-amino-phenyl | do. | do. | do. |
| 4-Dibenzylamino-phenyl | do. | do. | do. |
| 4-N-Phenyl-N-methyl-amino-phenyl | do. | do. | do. |
| 4-N-Phenyl-N-ethyl-amino-phenyl | do. | do. | do. |
| 4-N-4'-Methylphenyl-N-methyl-amino-phenyl | do. | do. | do. |
| 4-N-4'-Methoxyphenyl-N-methyl-amino-phenyl | do. | do. | do. |
| 4-N-4'-Ethoxyphenyl-N-methyl-amino-phenyl | do. | do. | do. |
| 4-N-4'-Ethoxyphenyl-N-ethyl-amino-phenyl | do. | do. | do. |
| 3-Carbazolyl | do. | do. | do. |
| 3-N-Methyl-carbazolyl | do. | do. | do. |
| 4-Ethoxy-phenyl | do. | do. | do. |
| 4-Phenoxy-phenyl | do. | do. | do. |
| 3-Indolyl | do. | do. | do. |
| 3-N-Methyl-indolyl | do. | do. | do. |
| 3-N-Methyl-2-phenyl-indolyl | do. | do. | do. |
| 4-Dimethylamino-phenyl | Methyl | do. | do. |
| do. | Dimethylamino | do. | do. |
| do. | Hydrogen | Pentamethylene | Pentamethylene |
| do. | do. | Methyl | Phenyl |
| do. | do. | Ethyl | do. |
| do. | do. | do. | Ethyl |
| do. | do. | n-Butyl | n-Butyl |

Suitable compounds of the formula XIV are, for example, N,N-dimethyl-, -diethyl-,-di-n-propyl-, -di-isopropyl-, di-n-butyl-, -di-isobutyl-, -di-n-pentyl- and di-n-hexyl-aniline, N-methyl-N-ethyl-, N-ethyl-N-n-butyl-, N-methyl-N-neopentyl-, N-iso-amyl-N-ethyl-, N-ethyl-N-$\beta$-chloroethyl-, N-ethyl-N-$\beta$-cyanoethyl-, N-ethyl-N-$\beta$-methoxyethyl-, N-ethyl-N-$\beta$-ethoxycarbonylethyl-, N-ethyl-N-$\beta$-amindocarbonylethyl- and N-ethyl-N-$\beta$-dimethylaminoethyl-aniline, N,N-di-$\beta$-chloroethyl-, -di-$\beta$-cyanoethyl-, -di-$\beta$-hydroxyethyl- and -di-$\beta$-methoxyethylaniline, N-methyl-N-allyl-, N-methyl-N-cyclohexyl-, N-methyl-N-benzyl-, N-methyl-N-$\beta$-phenylethyl-, N-methyl-N-phenyl-, N-ethyl-N-phenyl-, N-$\beta$-chloroethyl-N-phenyl-, N-$\beta$-cyanoethyl-N-phenyl-, N-methyl-N-4methylphenyl-, N-methyl-N-4-methoxy-phenyl-, N-ethyl-N-4-ethoxyphenyl-, and N-methyl-N-$\alpha$naphthylaniline, N,N-dimethyl- and -diethyl-m-toludine, -m-anisidine and -m-phenetidine, m-chloroaniline, 3-dimethylamino-N-ethoxycarbonyl-aniline, 3-diethylamino-N-dimethylamidocarbonylaniline, 2-methyl-n-ethyl-aniline, 2-methoxy-N-isobutylaniline, 2,5-dimethoxy-N-ethyl- and -N,N-diethyl-aniline, diphenylamine, 2-methyl- and 2-ethyl-diphenylamine, 4-methoxydiphenylamine, 2,2'-diethyldiphenylamine, tetrahydroquinoline, N-methyl-, N-ethyl-, N-$\beta$-cyanethyl-tetrahydroquinoline, indoline, 2-methyl-, 2-phenyl-, 2,3-dimethyl-, 2,3,3-trimethyl-, 1-methyl-, 1-ethyl-, 1-$\beta$-cyanoethyl-, 1,2-dimethyl-, 1,2,3-trimethyl-, and 1,2,3,3-tetramethyl-indoline, N-phenylpyrrolidine, N-phenylpiperdine, N-phenyl-morpholine, N-phenyl-piperazine, carbazole, N-methyl-, N-ethyl-, N-$\beta$-cyanoethyl-, N-benzylcarbazole, N-methylphenothiazine, N-methylphenoxazine, 1-N,N-dimethyl- and -diethylamino-naphthalene, 2-dimethylaminothiophene, 2-diemethylamino-thiazole, 2-dimethylamiano-4-phenylthiazole and 2-(phenyl-methyl-amino)-thiazole.

Suitable compounds of the formula XV are, for example, anisole, phenetole, resorcinol-dimethyl- and -diethyl-ether, 3-methyl-anisole, $\beta$-naphthol, neroline and diphenyl-ether.

Suitable compounds of the formula XVI are, for example, 1-phenyl-3-methyl-, 1-phenyl-3-hydroxy-, 1,3-diphenyl-, 1-phenyl-3-(4'-methoxyphenyl)-, 1-phenyl-3-(4'-methylphenyl)-, 1-phenyl-3-(4'-phenoxyphenyl)-, 1-phenyl-3-($\alpha$- or $\beta$-naphthyl)-, 1-phenyl-3-styryl-, 1,5-diphenyl-3-styryl-, 1-phenyl-3-($\alpha$-thienyl)-, 1-$\alpha$-naphthyl-3-(4'-methoxyphenyl)- and 1-$\alpha$-naphthyl-3-($\alpha$-thienyl)-pyrazoline-$\Delta 2$ as well as the corresponding 1-H-pyrazolines.

Suitable compounds of the formula XVII are, for example, 1-methyl-, 1-ethyl-, 1-benzyl-, 1-cyclohexyl-, 1,4,5-trimethyl-and 1-vinyl-pyrazoline-(A2), but above all those pyrazolines in which $R_{12}$ represents an aromatic ring system and which contain hydrogen in the 3-position, such as 1-phenyl-, 1-(4-methylphenyl)-, 1-(4-hydroxycarbonylphenyl)-, 1-(4-chlorophenyl)-, 1-(4-ethoxyphenyl)-, 1-$\alpha$-naphthyl-, 1-$\beta$-naphthyl-, 1-xenyl- and 1-(4-benzyl-phenyl-pyrazoline-$\Delta 2$, as well as pyrazolines of the formula

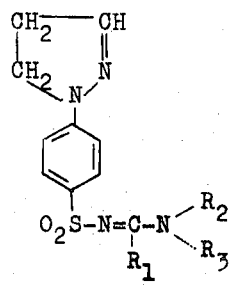

wherein
$R_1$, $R_2$ and $R_3$ have the meaning explained above.

Suitable compounds of the formula XVIII are, for -cyanoethyl-indole, example, N-methyl-pyrrole, N-ethyl-, N-n-propyl-, N-iso-butyl-, N-phenyl-, N-4-methoxyphenyl-, N-benzyl- and N-cyclohexyl-2,5-dimethyl-pyrrole, indole, N-methyl-, N-ethyl- and N-$\beta$-cyanoethyl-indole, 2-phenyl-indole, N-methyl-2-phenyl-indole, 2-($\alpha$-thienyl)-indole, N-methyl-2-($\alpha$-thienyl-indole, 2-methyl- and 1,2-dimethyl-indole.

The new dyestuffs are suitable for dyeing, printing and bulk dyeing materials which consist wholly or predominantly of polymerised unsaturated nitriles such as acrylonitrile and vinylidene cyanide or of acid-modified polyesters or of acid-modified polyamides. They are furthermore suitable for the other known uses of cationic dyestuffs, such as dyeing and printing cellulose acetate, coir, jute, sisal and silk, tannin treated cotton and paper, for the manufacture of ball pen pastes and rubber-stamp inks, and for use in flexographic printing. The dyeings and prints on the materials initially mentioned, especially on polyacrylonitrile, are distinguished by their very high level of fastness, above all by very good fastness to light, wet processing, rubbing, decatising, sublimation and perspiration. A particular advantage of the new dyestuffs is their unusually high solubility in water and polar organic solvents; this permits the manufacture of stable, highly concentrated solutions. The dyestuffs are furthermore distinguished by their extraordinary uniform absorption, which permits the production of completely uniform dyeings in a simple manner.

The insensitivity of the solutions of the new dyestuffs towards extraneous ions, such as thiocyanate, cyanide, oxalate, sulphate, bromide, chlorozincate and others, which with the known cationic dyestuffs give precipitates which can noticeably interfere with the use of the dyestuffs, is particularly emphasised. Such interference can be entirely avoided or substantially reduced by the use of the dyestuffs according to the invention.

The parts mentioned in the examples are parts by weight; the temperatures are given in degrees Centigrade.

EXAMPLE 1

55 parts of the compound of the formula

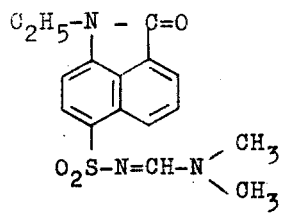

and 30 parts of N,N-diethylaniline and 325 parts of phosphorus oxychloride, with the addition of 30 parts of phosphorus pentoxide, are stirred for about 8 hours at approx. 80°. On cooling, a crystal paste results, which is poured into 2,000 parts of water. After complete hydrolysis of the phosphorus oxychloride, the resulting deep blue solution is neutralised with 350 parts of concentrated sodium hydroxide solution and additionally treated with 400 parts of sodium chloride.

The dyestuff of the formula

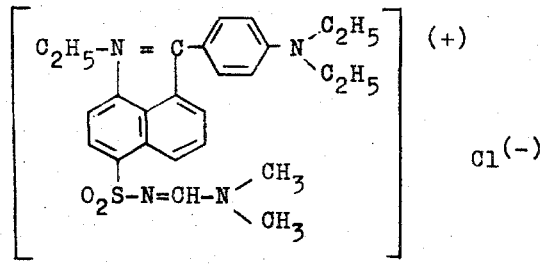

which has separated out as crystals is filtered off and dried. The yield is approximately quantitative. On polyacrylonitrile, the dyestuff yields brilliant reddish-tinged blue dyeings and prints of very good fastness to light and to washing. The dyestuff is distinguished by very good solubility in cold water.

The starting product had been manufactured as follows:

23.6 parts of N-ethylnaphtholactam are introduced into 108 parts of chlorosulphonic acid at a temperature below 40°, over the course of one hour. The batch is stirred for 30 minutes at 80° and after cooling to 30° is poured out onto 600 parts of ice. The sulphochloride which has precipitated is filtered off, washed with 30 parts of ice water and stirred in 75 parts of concentrated ammonia solution for 4 hours at 50° – 60°. The batch is adjusted to pH 5 with 120 parts of 15% strength hydrochloric acid and the precipitate is filtered off and dried in vacuo at 70°. 29.6 parts of N-ethyl-4-sulphon-amido-naphtholactam of melting point 215°–216° are obtained. 29.6 parts of N-ethyl-4-sulphonamido-naphtholactam in a solution of 16.7 parts of phosphorus oxychloride in 35.8 parts of dimethylformamide are stirred for 1 hour at room temperature. The solution is poured into a mixture of 430 parts of 10percent strength sodium chloride solution and 100 parts of ice and the precipitate is filtered off and dried in vacuo at 70°. 32.3 parts of 4-(N''-N''-dimethylformamidine-N'-sulphonyl-)-N-ethyl-naphtholactam of melting point 193°–194° are obtained.

Instead of the N-ethyl-naphtholactam, the particular equivalent amount of N-methyl-, N-n-butyl-, N-iso-butyl-, N-n-amyl-, N-iso-amyl-, N-$\beta$-chloroethyl-, N-$\beta$-cyanoethyl-, N-$\beta$-methoxyethyl-, N-$\beta$-methoxycarbonylethyl-, N-ethoxycarbonyl-methyl- or N-cyclohexyl-1,8-naphtholactam can also be employed. The compounds thus obtained on following the procedure of Example 1 again yield very valuable dyestuffs or similar tinctorial properties.

If instead of the diethylaniline one of the following amines is used in the particular equivalent amount and in other respects the procedure remains unchanged, new dyestuffs are again obtained, which dye polyacrylonitrile in the colour shade indicated.

| Amine | Colour shade |
|---|---|
| N,N-dimethyl-aniline | strongly reddish-tinged blue |
| N,N-di-n-propyl-aniline | blue |
| N,N-di-n-butyl-aniline | do. |
| N-ethyl-N-n-hexyl-aniline | do. |
| N-ethyl-N-iso-amyl-aniline | do. |
| N-ethyl-N-$\beta$-chloroethyl-m-toluidine | greenish-tinged blue |
| N,N-diethyl-m-phenetidine | blue |
| N-methyl-N-$\beta$-dimethylaminoethyl-aniline | blue-violet |
| N,N-dibenzyl-aniline | do. |
| N,N-di-$\beta$-cyanoethyl-aniline | strongly reddish-tinged blue |
| 2-methyl-N-iso-propyl-aniline | blue-violet |
| 2,5-dimethoxy-N-ethyl-aniline | greenish-tinged blue |
| 2,5-diethoxy-N-methyl-aniline | blue |
| N-methyl-N-cyclohexyl-aniline | do. |
| N-methyl-N-allyl-aniline | blue-violet |
| 1-dimethylamino-naphthalene | blue |

-Continued

| Amine | Colour shade |
|---|---|
| 1-diethylamino-naphthalene | do. |
| N-ethyl-N-β-phenylethyl-aniline | reddish-tinged blue |
| N,N-di-β-phenylethyl-aniline | do. |
| N-ethyl-N-β-methoxycarbonylethyl-aniline | do. |
| N-methyl-N-β-n-butoxycarbonylethyl-aniline | do. |
| N-Ethyl-N-β-hydroxycarbonylethyl-aniline | do. |
| N-Ethyl-N-β-ethoxyethyl-aniline | do. |
| N-Ethyl-N-β-n-butoxyethyl-aniline | do. |
| 4-Methyl-3'-hydroxy-diphenylamine | reddish-tinged blue |
| 4-Methyl-3'-methoxy-diphenylamine | do. |
| 4,3'-Diethoxy-diphenylamine | do. |
| N-Methyl-diphenylamine | reddish-tinged blue |
| N-Ethyl-diphenylamine | blue |
| N-Methyl-4-methoxy-diphenylamine | greenish-tinged blue |
| N-Ethyl-4-methoxy-diphenylamine | do. |
| N-Methyl-4-ethoxy-diphenylamine | do. |
| Triphenylamine | strongly greenish-tinged blue |
| 4,4'-Dimethoxy-triphenylamine | strongly green-blue |
| Carbazole | red-violet |
| N-Ethyl-carbazole | violet |
| Phenoxazine | green |
| N-β-Cyanoethyl-tetrahydro-quinoline | blue |
| N-Methyl-indoline | do. |
| N-Methyl-2-methyl-indoline | do. |
| N-Methyl-2-phenyl-indoline | do. |
| N-Phenyl-pyrrolidine | do. |
| N-Phenyl-piperidine | do. |
| N-Phenyl-morpholine | reddish-tinged blue |

EXAMPLE 2 34.3 g of the compound of the formula

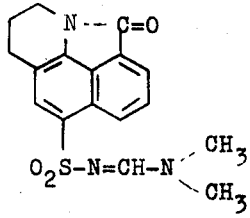

(manufactured in accordance with the instructions in Example 1, using N,2-trimethylene-1,8-naphtholactam as the starting product) and 11.7 parts of indole are warmed with 150 parts of chlorobenzene and 25 parts of phosphorus oxychloride for 6 hours to 90° – 100°. Thereafter the chlorobenzene is distilled off under reduced pressure. The residue is recrystallised from water. The dyestuff of the formula

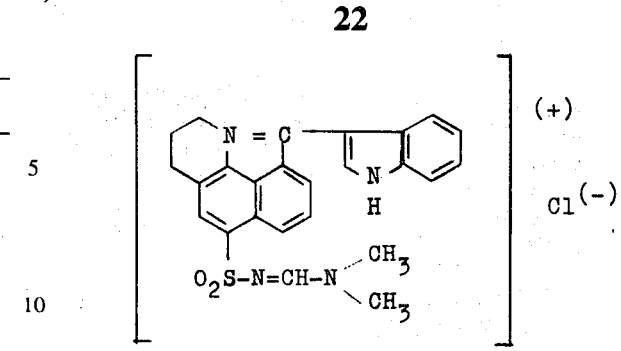

is obtained which on polyacrylonitrile gives bluish-tinged red dyeings and prints of outstanding fastness.

If instead of indole the particular equivalent amount of 1-methyl-, 1-ethyl-, 1-phenyl-, 1-benzyl-, 1-β-cyanoethyl-, 1,2-dimethyl-, 2-methyl-, 2-phenyl-, 1-methyl-2-phenyl- or 1-methyl-2-α-thienyl-indole, is used, new dyestuffs of corresponding structure, which are also outstandingly fast, are obtained.

EXAMPLE 3

66 parts of the compound of the formula

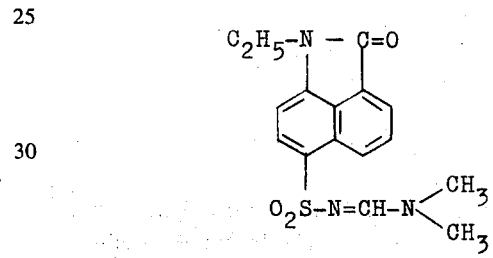

and 45 parts of 1,3-diphenyl-pyrazoline are warmed with 450 parts of phosphorus oxychloride and 50 parts of phosphorus pentoxide. Dyestuff formation starts at approx. 80°. The mixture is kept at about 90° – 95° for 24 hours and is allowed to cool, and the excess condensation agent is decomposed with about 500 parts of water, whilst cooling well. The dyestuff which hereupon separates out is purified by recrystallisation from water, with the addition of charcoal. It corresponds to the formula

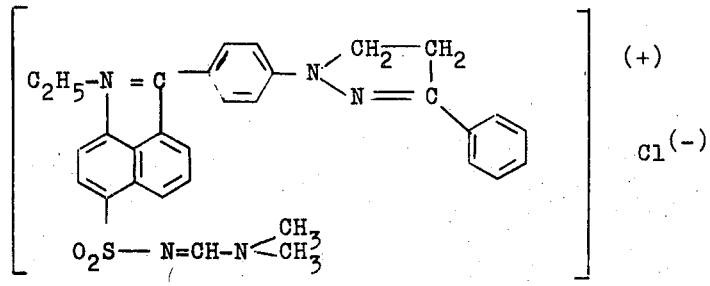

and dyes polyacrylonitrile in a blue colour of good fastness properties.

Instead of 1,3-diphenyl-pyrazoline, the particular equivalent amount of 1-phenyl-3-methyl-, 1-phenyl-3-(α-thienyl)-, 1-phenyl-3-(4'-methoxyphenyl)-, 1-(3'-methyl-phenyl)-3-methyl-, 1(-3'-methoxyphenyl)-3-phenyl- and 1-(3', 6'-dimethoxyphenyl)-3-phenyl-pyrazoline-(Δ2) can also be used.

EXAMPLE 4

A mixture of 40 parts of N-methyl-phenoxazine, 66 parts of the naphtholactam derivative used in Example 3, 600 parts of phosphorus oxychloride and 30 parts of phosphorus pentoxide is stirred at about 90° until the mixture solidifies into a stiff crystal paste; this is the case after 3 to 4 hours. The cooled crystal paste is decomposed with water and the precipitate thereby obtained is extracted by boiling with 10 – 20,000 parts of water. On cooling, the dyestuff of the formula

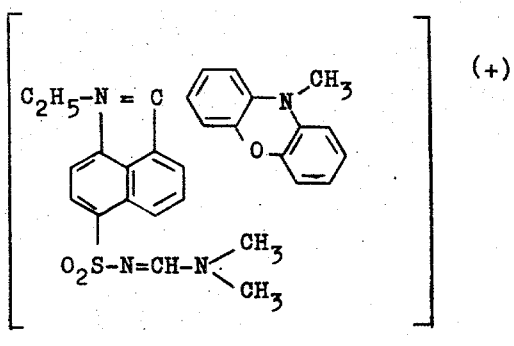

separates out from the filtrate. On polyacrylonitrile, the dyestuff yields very fast green dyeings and prints.

Instead of the N-methyl-phenoxazine, the particular equivalent amounts of N-ethyl-, N-β-hydroxyethyl-, N-β-chloroethyl-, N-β-cyanoethyl-, N-β-methoxyethyl-, N-β-dimethylamino-ethyl-, N-β-methoxycarbonylethyl-, N-β-hydroxycarbonylethyl-, N-allyl-, N-n-butyl or N(or 10-),2,8-trimethyl-phenoxazine can also be employed. In that case, with the procedure otherwise unchanged, valuable green dyestuffs are again obtained.

EXAMPLE 5

8.3 parts of the naphtholactam derivative used in Example 3 and 4.3 parts of diphenylamine are heated with 10 parts of phosphorus oxychloride and 6 parts of tin tetrachloride for 10 minutes to 130°. The cooled mixture is treated with 50 parts of methanol. After the solvolysis of the condensation agent is substantially complete, the mass is briefly boiled up. After cooling, the product is filtered off and the dyestuff, together with a second fraction obtained on distilling off the methanol, is recrystallised from water. It corresponds to the formula and gives very fast blue dyeings and prints on polyacrylonitrile.

EXAMPLE 6

79 parts of the compound of the formula and 50 parts of N,N-diethylaniline are stirred with 500 parts of phosphorus oxychloride and 50 parts of phosphorus pentoxide for 20 hours at about 90°. After cooling, the mixture is dissolved in 3,000 parts of water.

The dyestuff is separated out by adding 850 parts of concentrated sodium hydroxide solution and 300 parts of sodium chloride and is purified by recrystallisation from 4,000 parts of water, with the addition of active charcoal. It corresponds to the formula

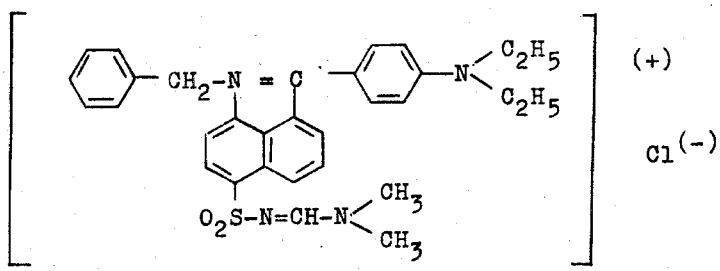

and gives very fast blue dyeings and prints on polyacrylonitrile.

The naphtholactam derivative used had been manufactured as follows:

170 parts of 1,8-naphtholactam and 60 parts of powdered potassium hydroxide are stirred in 600 parts of dimethylformamide. 130 parts of benzyl chloride are added dropwise at 50° – 60° and the mixture is thereafter stirred initially for 30 minutes at 60°, then for 1 hour at 80° and finally for 1 hour at 110°. After cooling, it is diluted with 3,000 parts of water and filtered, and the residue is washed with water and dried at about 60°. 235.1 parts of crude N-benzyl-naphtholactam, melting at between 104 and 108°, are obtained. A sample recrystallised from alcohol melts at 120° – 122°.

52 parts of N-benzylnaphtholactam are introduced into 220 parts of chlorosulphonic acid at room temperature. The batch is stirred for 2 hours at 20° – 30°, poured into 2,000 parts of ice and filtered. The moist residue is stirred in 200 parts of concentrated ammonia solution for 10 hours at room temperature and the mixture is rendered weakly acid with hydrochloric acid and filtered. The residue is washed with water and dried in vacuo at 70°. 61 parts of N-benzyl-4-sulphonamido-naphtholactam of melting point 190° –193° are obtained. 61 parts of N-benzyl-4-sulphonamidonaphtholactam in a mixture of 180 parts of dimethylformamide and 36 parts of phosphorus oxychloride are stirred for 1 hour at room temperature. The batch is poured onto a mixture of 900 parts of 10% strength sodium chloride solution and 300 parts of water. The product is filtered off and dried in vacuo at 70°. 62 parts of 4-(N'',N''-dimethylformamidine-N-sulphonyl)-N-benzyl-naphtholactam are obtained. If instead of dimethylformamide the corresponding amount of diethyl-, di-n-butyl-, N-methyl-N-$\beta$-cyanoethyl-, N-methyl-N-$\beta$-chloroethyl-, N-methyl-N-$\beta$-ethoxyethyl-, N-methyl-N-$\beta$-hydroxycarbonylethylformamide or N-formyl-piperidine, -pyrrolidine, -piperazine or morpholine is used, the correspondingly substituted naphtholactam derivatives are obtained, which following the procedure of this example are again converted into valuable blue dyestuffs of analogous structure.

EXAMPLE 7

A mixture of 7.5 parts of the compound of the formula

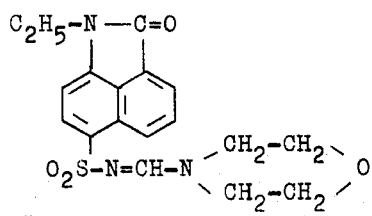

4.6 parts of 4-ethoxy-N-methyl-diphenylamine, 50 parts of phosphorus oxychloride and 3 parts of phosphorus pentoxide is stirred for 15 hours at about 75°. Thereafter, the excess condensation agent is decomposed by pouring the mixture into 300 parts of water whilst cooling. The dyestuff which hereupon separates out can be purified by recrystallisation from water. It corresponds to the formula

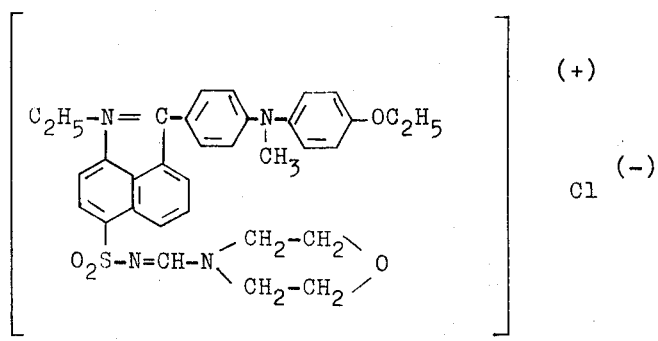

and gives outstandingly fast, greenish-tinged blue dyeings and prints on polyacrylonitrile.

If instead of 4-ethoxy-N-methyldiphenylamine the particular equivalent amount of 4-ethoxy-N-ethyl-, 4-ethoxy-N-$\beta$-cyanoethyl-, 4-n-butoxy-N-ethyl-, 4-iso-amyloxy-N-ethyl-, 3,4-diisopropoxy-N-methyl-, N-methyl-, N-ethyl-, N-$\beta$-chloroethyl- or N-n-butyl-diphenylamine is used, very fast blue dyestuffs are again obtained. The naphtholactam derivative used had been manufactured in accordance with the instructions of Example 13, using morpholine instead of methylbenzylamine.

EXAMPLE 8

39.9 parts of the compound of the formula

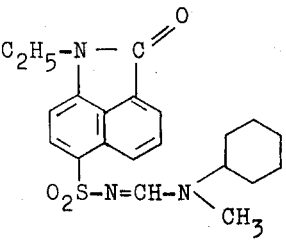

and 21 parts of N,N-di-n-butyl-aniline are stirred with 500 parts of phosphorus oxychloride and 25 parts of anhydrous aluminium chloride for about 12 hours at 90° – 100°. Working-up is carried out in accordance with the instructions of Example 6. The dyestuff thus obtained corresponds to the formula

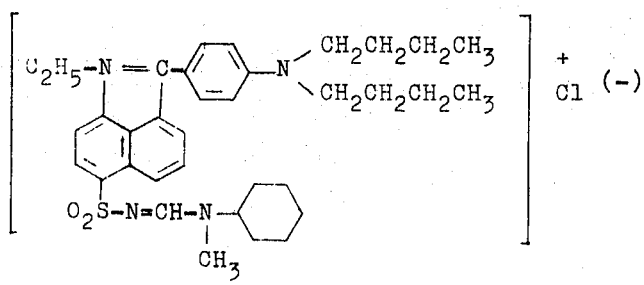

and on polyacrylonitrile gives very fast reddish-tinged blue dyeings and prints. The naphtholactam used had been manufactured as follows.

55.2 parts of N-ethyl-4-sulphonamido-naphtholactam are stirred for 1 hour at 30° – 40° in a mixture of 28.2 parts of N-formyl-N-methylcyclohexylamine and 200 parts of chloroform into which 20 parts of phosgene had previously been passed at room temperature.

The chloroform is distilled off and 400 parts of 10% strength sodium chloride solution are added to the residue. The product is filtered off, washed with water and dried in vacuo at 70°. The product is recrystallised from methanol/dimethylformamide. 42 parts of the compound of the first formula in Example 8, of melting point 138° – 140°, are obtained. If one of the naphtholactam derivatives listed in the table below and obtainable analogously is used instead of that mentioned above, very valuable, tinctorially similar new dyestuffs are again obtained.

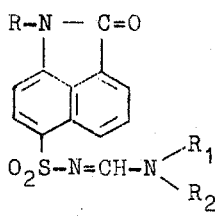

| R | $R_1$ | $R_2$ |
|---|---|---|
| Methyl | Methyl | Methyl |
| Methyl | Ethyl | Ethyl |
| Methyl | n-Propyl | n-Propyl |
| Methly | n-Butyl | n-Butyl |
| Methyl | Iso-amyl | Iso-amyl |
| Methoxycarbonylmethyl | Methyl | Methyl |
| Ethoxycarbonylmethyl | n-Butyl | n-Butyl |
| Ethyl | Iso-propyl | Iso-propyl |
| Ethyl | Methyl | Ethyl |
| Ethyl | Methyl | n-Butyl |
| Ethyl | Methyl | Cyclohexyl |
| Ethyl | Methyl | Phenyl |
| Ethyl | Methyl | Benzyl |
| Ethyl | Methyl | β-Cyanoethyl |
| Ethyl | Methyl | β-Chloroethyl |
| β-Cyanoethyl | Methyl | Methyl |
| β-Methoxycarbonylethyl | Methyl | Methyl |
| n-Propyl | Methyl | Methyl |
| n-Butyl | Methyl | Methyl |
| n-Butyl | Methyl | n-Butyl |
| n-Butyl | n-Propyl | n-Propyl |
| n-Butyl | $R_1+R_2$=Morpholine | |
| n-Butyl | $R_1+R_2$=Piperazine | |
| n-Butyl | $R_1+R_2$=N-β-Hydroxyethyl-piperazine | |
| Allyl | Methyl | Methyl |
| Benzyl | n-Butyl | n-Butyl |
| β-Phenylethyl | Methyl | Methyl |
| β-Phenylethyl | $R_1+R_2$=Morpholine | |
| Cyclohexyl | Methyl | Methyl |
| Phenyl | Methyl | Methyl |
| Phenyl | $R_1+R_2$=Morpholine | |

EXAMPLE 9

37.4 parts of the compound of the formula

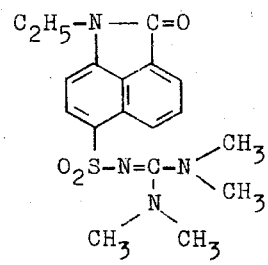

and 17.7 parts of N,N-di-n-propyl-aniline together with 200 parts of phosphorus oxychloride and 20 parts of zinc chloride are warmed to 90° – 100° for 20 hours. Working-up in accordance with the instructions of Example 6 yields the dyestuff of the formula

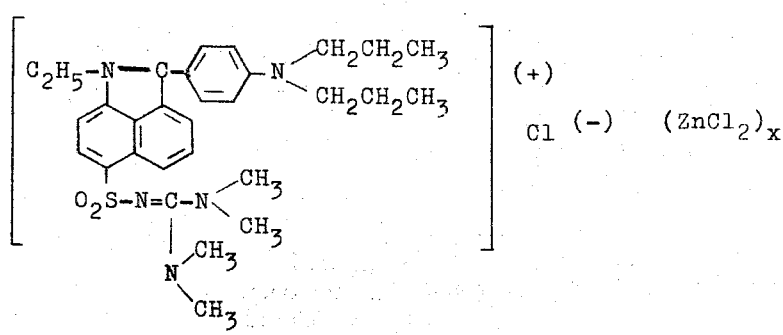

which on polyacrylonitrile gives very fast, blue dyeings and prints. The starting product had been manufactured as follows:

40 parts of phosphorus oxychloride are added at room temperature to 200 parts of tetramethylurea. 55.2 parts of N-ethyl-4-sulphamido-naphtholactam are then added. The batch is stirred for 3 hours at 100° – 110° and poured onto 800 parts of water. The product is separated from the water and recrystallised from methanol/dimethylformamide. Instead of tetramethylurea, tetraethylurea, carbonyl-di-pyrrolidine, carbonyl-di-piperidine or -morpholine can also be used. The sulphonylguanidines thus obtainable can be employed in the same way as the tetramethyl derivative; they also give valuable new dyestuffs with similar tinctorial properties.

EXAMPLE 10

A solution of 30 parts of the compound of the formula

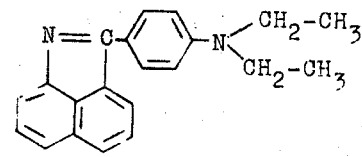

which was manufactured in a known manner by condensation of 1,8-naphtholactam with diethylaniline and phosphorus oxychloride and subsequent treatment with excess alkali, in 500 parts of dry toluene, is heated with 20 parts of N-β-chloroethylsulphonyl-N',N'-dimethylformamidine to the boil for 2 – 3 hours. After cooling, the dyestuff of the formula

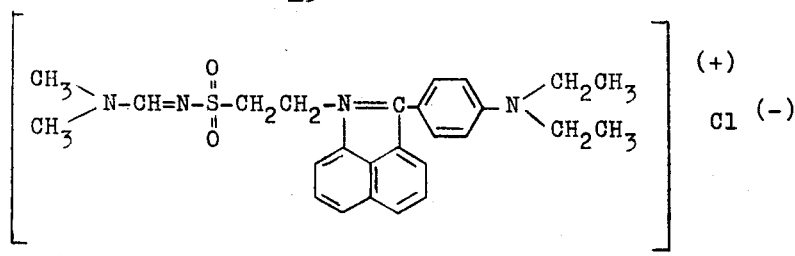

is filtered off and washed with benzene or cyclohexane. On polyacrylonitrile, the dyestuff yields very brilliant, fast blue-violet dyeings and prints. If one of the compounds listed in the table which follows is used as the dyestuff base, valuable new dyestuffs are again obtained. Instead of toluene, chlorobenzene can also be used as the solvent.

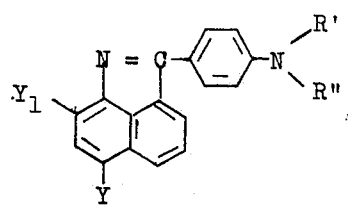

and 27 parts of the aniline derivative of the formula

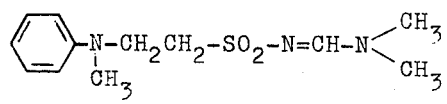

together with 200 to 300 parts of phosphorus oxychloride and 20 parts of phosphorus pentoxide or phosphorus pentachloride are warmed at 90° for about 20 hours. The cooled mixture is poured into 2,000 parts of ice water. After completion of hydrolysis of the condensation agent, the dyestuff of the formula

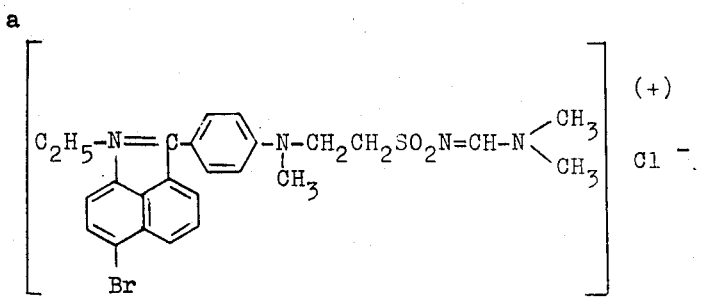

| Y | $Y_1$ | R'' | R'' | Colour Shade |
|---|---|---|---|---|
| Hydrogen | Hydrogen | Methyl | Methyl | Violet |
| Hydrogen | Hydrogen | n-Propyl | n-Propyl | Blue-violet |
| Hydrogen | Hydrogen | Methyl | Phenyl | Reddish-tinged blue |
| Hydrogen | Hydrogen | Methyl | Benzyl | Violet |
| Chlorine | Hydrogen | Ethyl | Ethyl | Reddish-tinged blue |
| Chlorine | Chlorine | Ethyl | Ethyl | Reddish-tinged blue |
| Bromine | Hydrogen | Ethyl | Ethyl | Reddish-tinged blue |
| Bromine | Bromine | Ethyl | Ethyl | Reddish-tinged blue |
| Methoxy | Hydrogen | Ethyl | 4'-Ethoxyphenyl | Greenish-tinged blue |
| Hydrogen | Ethyl | Ethyl | Ethyl | Violet |

EXAMPLE 11

27.6 parts of the compound of the formula

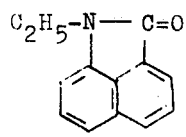

is separated out by neutralising the strongly acid solution with sodium hydroxide solution and adding 200 parts of sodium chloride. The dyestuff gives fast reddish-tinged blue dyeings and prints on polyacrylonitrile.

If instead of N-ethyl-4-bromo-1,8-naphtholactam, 33.1 parts of N-ethyl-4-dimethylformamidinosulphonyl-1,8-naphtholactam (Example 1) are used, the dyestuff of the formula

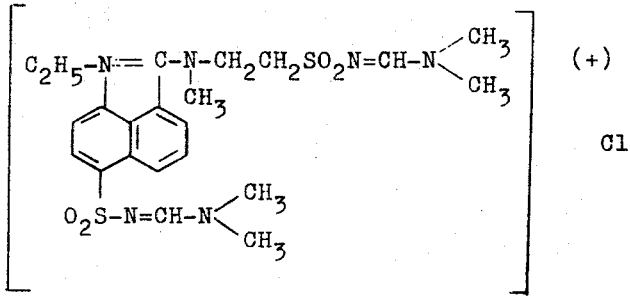 (+)

Cl (−)

which is also reddish-tinged blue, is obtained. Corresponding dyestuffs are obtained from the naphtholactam derivatives mentioned in Example 8 (Table).

EXAMPLE 12

20 parts of 1,3,3-trimethyl-2-methylene-indoline-ω-aldehyde and 27 parts of the aniline derivative used in Example 11 are stirred with 300 parts of chloroform and 75 parts of phosphorus oxychloride for 4 to 6 hours at the reflux temperature. The crude dyestuff which remains after distilling off the chloroform and the excess phosphorus oxychloride is purified by recrystallisation from water with the addition of active charcoal. It corresponds to the formula

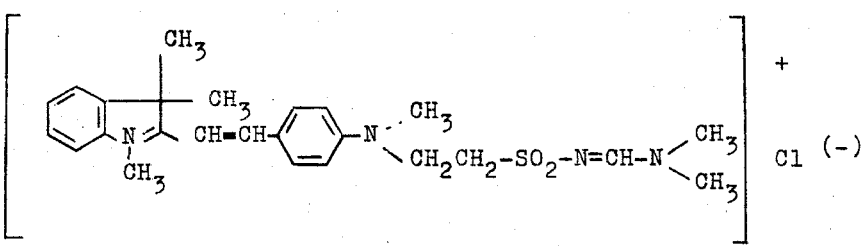 + Cl (−)

and dyes polyacrylonitrile in very clear, bluish-tinged red shades. Instead of the abovementioned ω-aldehyde, the particular equivalent amount of 5-chloro-, 5-methyl-, 5-methoxy-, 5-methoxycarbonyl-, 7-methyl-, 7-ethyl-, 7-chloro-, 7-phenyl-, or 5,7-dichloro-1,3,3-trimethyl-2-methylene-ω-aldehyde can also be used.

EXAMPLE 13

40.7 parts of the compound of the formula

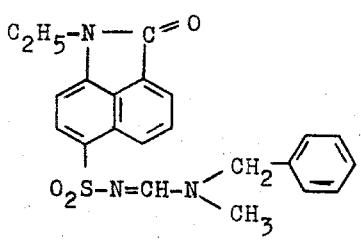

and 23.6 g of diethylamino-carbanilic acid ethyl ester are warmed with 300 parts of phosphorus oxychloride for 15 hours to 80° – 90°. Thereafter the bulk of the phosphorus oxychloride is removed under reduced pressure and the remainder is hydrolysed by stirring with 500 parts of water. The strongly acid solution is neutralised to pH = 2 – 3 with sodium hydroxide solution at room temperature. The dyestuff filtered off after addition of about 50 parts of sodium chloride corresponds to the formula

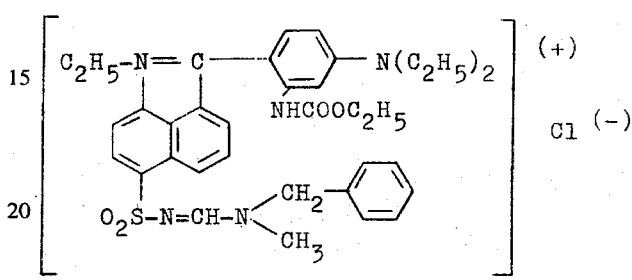 (+)

Cl (−)

and dyes polyacrylonitrile in a fast blue colour. Instead of the abovementioned carbanilic acid ester, the following compounds can also be employed in the particular equivalent amount: 3-dimethylamino-carbanilic acid methyl ester, ethyl ester, n- and iso-propyl ester, n- and iso-butyl ester, β-chloroethyl ester, β-cyanoethyl ester, β-methoxyethyl ester and β-ethoxyethyl ester, 3-di-n-propyl-, 3-di-iso-propyl-, 3-di-n-butyl- and 3-N-ethyl-N-β-cyanoethyl-amino-carbanilic acid ethyl ester as well as N,N-dimethyl- and N,N-diethyl-N'-(3diethylamino-phenyl)-urea.

The naphtholactam derivative used had been obtained as follows:

60 parts of N-ethyl-4-sulphonamido-naphtholactam in 200 parts of orthoformic acid ester are boiled for 15 hours under reflux. After cooling to room temperature, the mixture is filtered and the residue is washed with 50 parts of methanol. 50 parts of the compound of the formula

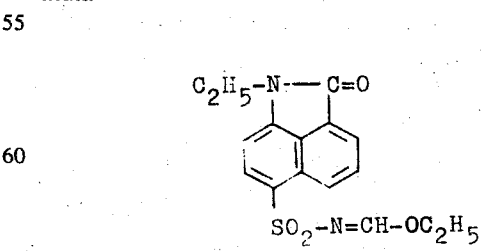

of melting point 124° – 125° are obtained. 40 parts of this compound and 60 parts of N-methylbenzylamine are stirred for 2 hours at 50°. The mixture is cooled to room temperature and the product is washed with methanol and dried in vacuo at 70°. 47.2 parts of the compound of the first formula in Example 13, having a melting point of 180°-181°, are obtained.

EXAMPLE 14

41 parts of 2-methoxy-diphenylamine and 66 parts of the naphtholactam derivative used in Example 1 are heated to the boil with 800 parts of phosphorus oxychloride and 100 parts of phosphorus pentoxide for 5 hours. The cooled mixture is hydrolysed with 6,000 parts of ice water. The dyestuff which has separated out is filtered off and purified by recrystallisation from water with the addition of 1 – 2 parts of active charcoal. It corresponds to the formula

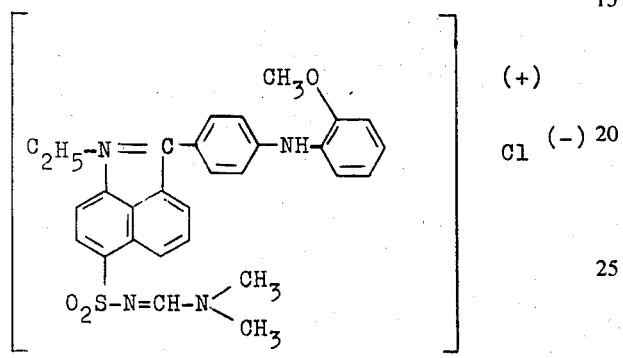

and gives outstandingly fast, blue dyeings and prints on polyacrylonitrile and acid-modified polyesters. If instead of 2-methoxy-diphenylamine the particular equivalent amount of 2,4-dimethoxy-, 2-ethoxy-, 2,5-diethoxy-, 2-methyl-, 2-ethyl- or 2,5-dimethyl-diphenylamine is used, outstandingly fast new dyestuffs are again obtained.

EXAMPLE 15

35.7 parts of the compound of the formula

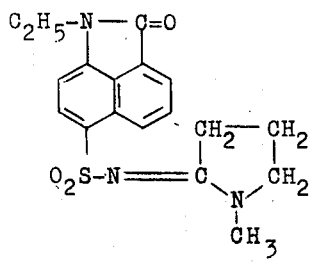

and 22 parts of N-ethyl-N-β-cyanoethyl-aniline are stirred with 200 parts of phosphorus oxychloride for 15 hours at about 90°. Working-up takes place analogously to the instructions in Example 1. The dyestuff of the formula

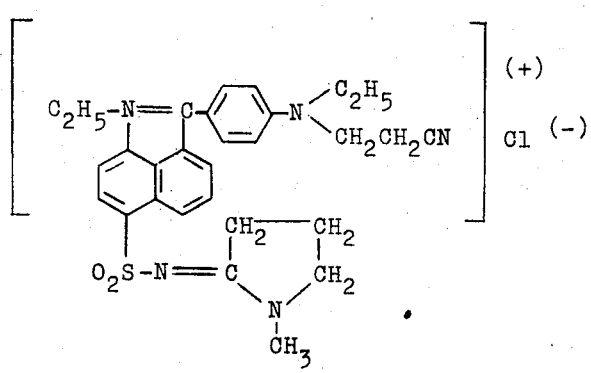

is obtained, which gives very fast, reddish-tinged blue dyeings and prints on polyacrylonitrile. The naphtholactam derivative used had been manufactured as follows:

27.6 parts of 4-sulphonamido-N-ethylnaphtholactam are dissolved in 70 parts of N-methyl-pyrrolidone. 15.6 parts of phosphorus oxychloride are added dropwise at 30° – 40°. The batch is stirred for 3 hours at 100° and is poured into 800 parts of water. The product is filtered off and dried in vacuo at 70°. The compound melts at 200° – 201°.

EXAMPLE 16

31.7 parts of the compound of the formula

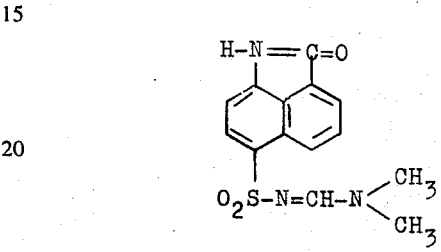

and 20 parts of N,N-diethylamine are heated with 300 – 350 parts of phosphorus oxychloride to 100° for about 10 hours. The cooled mixture is hydrolysed with about 1,000 parts of water and is then poured into excess aqueous ammonia solution. The dyestuff base thus obtained, of the formula

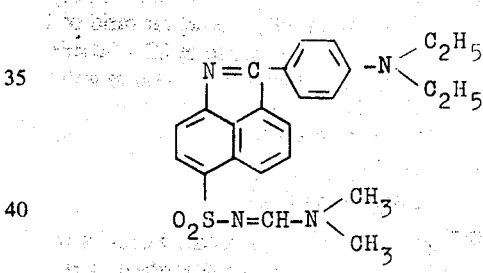

is dissolved in toluene. The solution is dried azeotropically by distilling off a part of the solvent. A solution thus obtained, of 22.4 parts of dyestuff base in 500 parts of toluene is treated with 10 parts of dimethyl sulphate at 90° – 100° and the mixture is kept at about 100° for 2 hours. After cooling, the quaternisation product is filtered off and washed with toluene or benzene. It corresponds to the formula

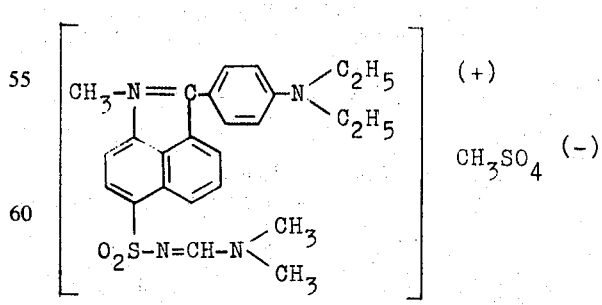

and is tinctorially very similar to the homologous dyestuff of Example 1. Instead of the naphtholactam derivative formulated above, its N-acyl derivatives, which split off the acyl radical during the condensation, can also be employed; this is true, in particular, of the N-formyl derivative of the formula

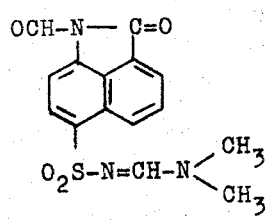

This formyl derivative is obtained in accordance with the process described in Example 1, using 1,8-naphtholactam. It melts at above 300°. The formyl group can be split off in the usual manner, for example by heating with dilute hydrochloric acid or sulphuric acid.

EXAMPLE 17

An aqueous dyebath containing, per litre, 0.75 g of 30% strength acetic acid, 0.40 g of sodium acetate and 0.25 g of the dyestuff of the formula

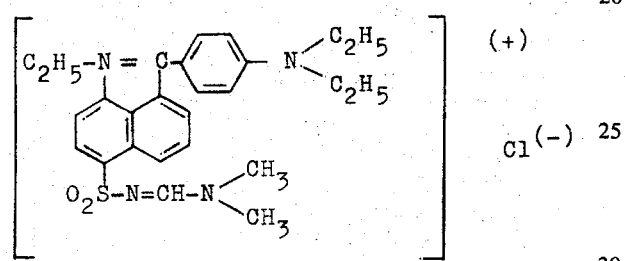

is charged, at approx. 45°C, with the amount of polyacrylonitrile fibres corresponding to a liquor ratio of 1 : 40, heated to the boil over the course of 20 – 30 minutes and kept at this temperature for 30 – 60 minutes. After rinsing and drying the fibre, a brilliant, reddish-tinged blue dyeing of very good fastness to light is obtained.

EXAMPLE 18

Acid-modified polyglycol terephthalate fibres of the type DACRON 64 (DuPont), or as described in Belgian Patent Specification 549,179 and U.S. Pat. No. 2,893,816, are introduced, in a liquor ration of 1 : 40, into an aqueous bath at 20° which per litre contains 3 g of sodium sulphate, 0.5 – 2 g of an oleyl polyglycol ether (50 mols of ethylene oxide), 2.5 – 5 g of diphenyl and 0.3 g of the dyestuff of the formula of Example 1, and which has been adjusted to a pH-value of 4.5 – 5.5 with acetic acid. The mixture is heated to 98° over the course of 30 minutes and the bath is kept at this temperature for 60 minutes. Thereafter the fibres are rinsed and dried. A brilliant, reddish-tinged blue dyeing of very good fastness properties is obtained.

EXAMPLE 19

In a dyeing beaker of 500 ml capacity located in a heated waterbath, 0.75 g of the dyestuff of the formula of Example 1 are worked into a paste with a 20-fold amount of hot water, with the addition of a little acetic acid, and are dissolved by means of hot water. 0.5 g of the reaction product of 50 mols of ethylene oxide with 1 mol of oleyl alcohol are further added to the dyeing liquor, which is made up to 500 ml with cold water. The pH-value of the dyeing liquor is adjusted to 4.5 – 5 with acetic acid or sodium acetate.

10 g of piece goods of acid-modified polyamide are constantly agitated in this dyeing liquor, whilst raising the temperature to 100°C over the course of 15 minutes. Dyeing is carried out at the boil for 15 – 20 minutes and the material is rinsed with cold water and subsequently dried, for example by ironing or in a drying cabinet at 60 – 70°C. A material dyed reddish-tinged blue is obtained.

EXAMPLE 20

A polyacrylonitrile fabric is printed with a printing paste of the following composition: 30 parts of the dyestuff of the formula of Example 1, 50 parts of thiodiethylene glycol, 30 parts of cyclohexanol, 30 parts of 30% strength acetic acid, 500 parts of crystal gum, 30 parts of aqueous zinc nitrate solution ($d = 1.5$) and 330 parts of water.

The resulting print is dried, steamed for 30 minutes and subsequently rinsed. A brilliant, reddish-tinged blue print having very good fastness properties is obtained.

We claim:
1. A dyestuff of the formula

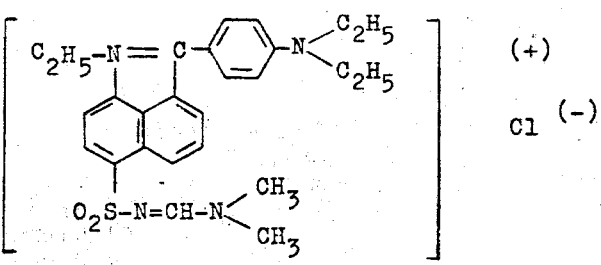

2. Dyestuff of the general formula

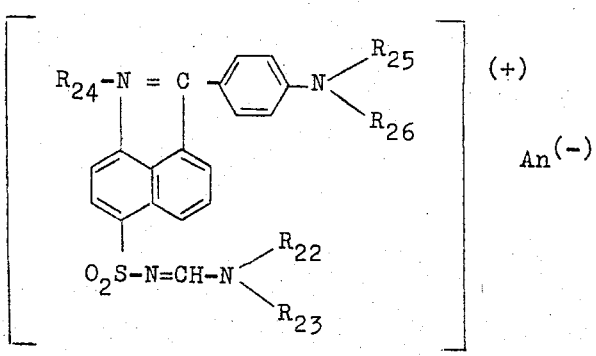

wherein
$R_{22}$ denotes alkyl of 1 to 4 carbon atoms;
$R_{23}$ denotes alkyl of 1 to 4 carbon atoms;
$R_{24}$ denotes alkyl of 1 to 5 carbon atoms;
$R_{25}$ denotes methyl, ethyl, n-propyl, n-butyl;
$R_{26}$ denotes methyl, ethyl, n-propyl, n-butyl; and
An (⁻) represents an anion.

* * * * *